(12) United States Patent
Kennedy

(10) Patent No.: US 9,366,239 B2
(45) Date of Patent: Jun. 14, 2016

(54) WEATHER RESPONSIVE TREADLE LOCKING MEANS FOR POWER GENERATION SYSTEM

(71) Applicant: Kinetic Energy Corporation, Columbia, MD (US)

(72) Inventor: Eugene J. Kennedy, Philadelphia, PA (US)

(73) Assignee: Kinetic Energy Corporation, Columbia, MD (US)

( * ) Notice: Subject to any disclaimer, the term of this patent is extended or adjusted under 35 U.S.C. 154(b) by 0 days.

(21) Appl. No.: 13/914,547

(22) Filed: Jun. 10, 2013

(65) Prior Publication Data

US 2014/0152021 A1 Jun. 5, 2014

Related U.S. Application Data

(60) Division of application No. 12/695,136, filed on Jan. 27, 2010, now Pat. No. 8,461,701, and a continuation of application No. 12/695,132, filed on Jan. 27, 2010, now Pat. No. 8,461,700, and a continuation of (Continued)

(51) Int. Cl.
*F02B 63/04* (2006.01)
*F03G 7/08* (2006.01)
*H02K 7/18* (2006.01)

(52) U.S. Cl.
CPC . *F03G 7/08* (2013.01); *Y10T 307/50* (2015.04)

(58) Field of Classification Search
CPC ............ F03G 7/08; H02K 7/1853; E01C 9/00

USPC ..................... 290/1 R, 1 C; 404/71
See application file for complete search history.

(56) References Cited

U.S. PATENT DOCUMENTS

| 1,312,131 A | 8/1919 | Morton |
| 1,771,200 A | 7/1930 | Akers |
| 1,916,873 A | 7/1933 | Wiggins |
| 3,748,443 A | 7/1973 | Kroll et al. |
| 3,859,589 A | 1/1975 | Rush |

(Continued)

FOREIGN PATENT DOCUMENTS

| CH | 1986/007504 A1 | 12/1986 |
| CN | 201045331 Y | 4/2008 |

(Continued)

OTHER PUBLICATIONS

National Search Report CN2010800146126 dated Aug. 6, 2013.

(Continued)

*Primary Examiner* — Hae Moon Hyeon
(74) *Attorney, Agent, or Firm* — John J. Dresch; Dresch IP Law, PLLC

(57) ABSTRACT

A vehicle energy harvester including a subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle; and a treadle locking device that selectively locks the vehicle activated treadle in the second position.

20 Claims, 5 Drawing Sheets

Related U.S. Application Data application No. 12/695,146, filed on Jan. 27, 2010, now Pat. No. 8,466,571, and a continuation of application No. 12/695,139, filed on Jan. 27, 2010, now Pat. No. 8,466,570, and a continuation of application No. 12/695,143, filed on Jan. 27, 2010, now Pat. No. 8,471,395, and a continuation of application No. 12/695,148, filed on Jan. 27, 2010.

(60) Provisional application No. 61/147,747, filed on Jan. 27, 2009, provisional application No. 61/147,748, filed on Jan. 27, 2009, provisional application No. 61/147,749, filed on Jan. 27, 2009, provisional application No. 61/147,750, filed on Jan. 27, 2009, provisional application No. 61/147,752, filed on Jan. 27, 2009, provisional application No. 61/147,754, filed on Jan. 27, 2009.

(56) References Cited

U.S. PATENT DOCUMENTS

| | | |
|---|---|---|
| 3,885,163 A | 5/1975 | Toberman |
| 3,918,844 A | 11/1975 | Bailey |
| 3,944,855 A | 3/1976 | Le Van |
| 4,004,422 A | 1/1977 | Le Van |
| 4,081,224 A | 3/1978 | Krupp |
| 4,115,034 A | 9/1978 | Smith |
| 4,130,064 A | 12/1978 | Bridwell |
| 4,211,078 A | 7/1980 | Bass |
| 4,212,598 A | 7/1980 | Roche et al. |
| 4,228,360 A | 10/1980 | Navarro |
| 4,238,687 A * | 12/1980 | Martinez .................. 290/1 R |
| 4,239,974 A | 12/1980 | Swander et al. |
| 4,239,975 A | 12/1980 | Chiappetti |
| 4,247,785 A | 1/1981 | Apgar |
| 4,250,395 A | 2/1981 | Lundgren |
| 4,309,150 A | 1/1982 | Payne |
| 4,322,673 A | 3/1982 | Dukess |
| 4,339,920 A | 7/1982 | Le Van |
| 4,409,489 A | 10/1983 | Hayes |
| 4,418,542 A | 12/1983 | Ferrell |
| 4,434,374 A | 2/1984 | Lundgren |
| 4,437,015 A | 3/1984 | Rosenblum |
| 4,614,875 A | 9/1986 | McGee |
| 4,700,540 A | 10/1987 | Byrum |
| 4,739,179 A | 4/1988 | Stites |
| 4,912,995 A | 4/1990 | Otters |
| 4,915,196 A | 4/1990 | Krisko |
| 4,944,474 A | 7/1990 | Jones |
| 4,980,572 A | 12/1990 | Sen |
| 5,119,136 A | 6/1992 | Morikawa |
| 5,157,922 A | 10/1992 | Baruch |
| 5,250,769 A | 10/1993 | Moore |
| 5,347,186 A | 9/1994 | Konotchick |
| 5,355,674 A | 10/1994 | Rosenberg |
| 5,449,909 A | 9/1995 | Kaiser et al. |
| 5,634,774 A | 6/1997 | Angel et al. |
| 5,648,645 A | 7/1997 | Arpagaus et al. |
| 5,678,933 A | 10/1997 | Ouchi et al. |
| 5,977,742 A | 11/1999 | Henmi |
| 5,984,432 A | 11/1999 | Otomo et al. |
| 6,023,134 A | 2/2000 | Carl et al. |
| 6,091,159 A | 7/2000 | Galich |
| 6,116,704 A | 9/2000 | Nakakita et al. |
| 6,172,426 B1 | 1/2001 | Galich |
| 6,204,568 B1 | 3/2001 | Runner |
| 6,353,270 B1 | 3/2002 | Sen |
| 6,362,534 B1 | 3/2002 | Kaufman |
| 6,376,925 B1 | 4/2002 | Galich |
| 6,467,266 B1 | 10/2002 | Kanazawa et al. |
| 6,494,144 B1 | 12/2002 | Perez Sanchez |
| 6,580,177 B1 | 6/2003 | Hagood et al. |
| 6,662,099 B2 | 12/2003 | Knaian et al. |
| 6,718,760 B1 | 4/2004 | Padera |
| 6,734,575 B2 | 5/2004 | Ricketts |
| 6,756,694 B2 | 6/2004 | Ricketts |
| 6,767,161 B1 | 7/2004 | Calvo et al. |
| 6,812,588 B1 | 11/2004 | Zadig |
| 6,858,952 B2 | 2/2005 | Gott et al. |
| 6,894,233 B2 | 5/2005 | Dingwall et al. |
| 6,936,932 B2 | 8/2005 | Kenney |
| 6,949,840 B2 * | 9/2005 | Ricketts .................. 290/1 R |
| 6,969,213 B2 | 11/2005 | Rastegar et al. |
| 7,043,904 B2 | 5/2006 | Newman |
| 7,067,932 B1 | 6/2006 | Ghassemi |
| 7,102,244 B2 | 9/2006 | Hunter, Jr. |
| 7,145,257 B2 | 12/2006 | Ricketts |
| 7,148,581 B2 | 12/2006 | Hershey et al. |
| 7,239,031 B2 | 7/2007 | Ricketts |
| 7,315,088 B2 | 1/2008 | Erriu |
| 7,347,643 B2 * | 3/2008 | Jeong .................. 404/13 |
| 7,371,030 B2 | 5/2008 | Hickman |
| 7,429,145 B2 | 9/2008 | Rastegar et al. |
| 7,541,684 B1 | 6/2009 | Valentino |
| 7,589,428 B2 | 9/2009 | Ghassemi |
| 7,629,698 B2 | 12/2009 | Horianopoulos et al. |
| 7,687,931 B2 | 3/2010 | Gasendo |
| 7,714,456 B1 | 5/2010 | Daya |
| 7,717,043 B2 * | 5/2010 | Rastegar et al. ............. 104/26.2 |
| 2002/0014314 A1 | 2/2002 | Miller |
| 2003/0132636 A1 | 7/2003 | Ricketts |
| 2003/0151381 A1 | 8/2003 | Kadota et al. |
| 2004/0066041 A1 | 4/2004 | Hunter, Jr. |
| 2005/0116545 A1 | 6/2005 | Hamel et al. |
| 2005/0143876 A1 | 6/2005 | Tanase |
| 2005/0200132 A1 | 9/2005 | Kenney |
| 2005/0268444 A1 | 12/2005 | Namerikawa et al. |
| 2006/0152008 A1 | 7/2006 | Ghassemi |
| 2006/0237968 A1 | 10/2006 | Chandrasekaran |
| 2007/0018803 A1 | 1/2007 | Lang |
| 2007/0020047 A1 | 1/2007 | Adair |
| 2007/0085342 A1 | 4/2007 | Horianopoulos et al. |
| 2007/0158945 A1 | 7/2007 | Annen et al. |
| 2007/0210652 A1 | 9/2007 | Tracy et al. |
| 2007/0264081 A1 * | 11/2007 | Chiu .................. 404/71 |
| 2008/0224477 A1 | 9/2008 | Kenney |
| 2009/0243304 A1 * | 10/2009 | Stein .................. 290/1 |
| 2009/0315334 A1 | 12/2009 | Chen |
| 2011/0148121 A1 * | 6/2011 | Kenney .................. 290/1 R |

FOREIGN PATENT DOCUMENTS

| | | |
|---|---|---|
| CN | 201050452 Y | 4/2008 |
| CN | 201396254 Y | 2/2010 |
| JP | 2000310102 A | 11/2000 |
| JP | 2002161848 A | 6/2002 |

OTHER PUBLICATIONS

National Search Report CN2010800146145 dated Jul. 26, 2013.
National Search Report CN2009801552247 dated Mar. 19, 2013.
Lee W. Young, International Search Report, PCT/US2009/066024, Apr. 2, 2010, p. 2, Alexandria, VA, US.
Blaine R. Copenheaver, International Search Report, PCT/US2009/066025, Mar. 10, 2010, p. 2, Alexandria, VA, US.
Lee W. Young, International Search Report, PCT/US2010/022287, Jun. 1, 2010, p. 2, Alexandria, VA, US.
Blaine R. Copenheaver, International Search Report, PCT/US2010/022288, Jul. 12, 2010, p. 2, Alexandria, VA, US.
Lee W. Young, International Search Report, PCT/US2010/022289, Jun. 1, 2010, p. 2, Alexandria, VA, US.
Lee W. Young, International Search Report, PCT/US2010/022291, Jun. 15, 2010, p. 2, Alexandria, VA, US.
Blaine R. Copenheaver, International Search Report, PCT/US2010/022294, Jun. 28, 2010, p. 2, Alexandria, VA, US.
Blaine R. Copenheaver, International Search Report, PCT/US2010/022296, Jul. 7, 2010, p. 2, Alexandria, VA, US.
Lee W. Young, International Search Report, PCT/US2010/020676, Jun. 15, 2010, p. 2, Alexandria, VA, US.

* cited by examiner

WEATHER RESPONSIVE TREADLE LOCKING MEANS FOR POWER GENERATION SYSTEM

CROSS-REFERENCE TO RELATED APPLICATIONS

The present invention claims the benefit of U.S. Provisional Patent Application No. 61/147,747, filed Jan. 27, 2009, and entitled "TRANSIENT ABSORBER FOR POWER GENERATION SYSTEM", U.S. Provisional Patent Application No. 61/147,748, filed Jan. 27, 2009, and entitled "WEATHER RESPONSIVE TREADLE LOCKING MEANS FOR POWER GENERATION SYSTEM", U.S. Provisional Patent Application No. 61/147,749, filed Jan. 27, 2009, and entitled "LOW PROFILE, SURFACE-MOUNTED POWER GENERATION SYSTEM", U.S. Provisional Patent Application No. 61/147,750, filed Jan. 27, 2009, and entitled "VEHICLE SPEED DETECTION MEANS FOR POWER GENERATION SYSTEM", U.S. Provisional Patent Application No. 61/147,752, filed Jan. 27, 2009, and entitled "RECIPROCAL SPRING ARRANGEMENT FOR POWER GENERATION SYSTEM", and U.S. Provisional Patent Application No. 61/147,754, filed Jan. 27, 2009, and entitled "LOSSLESS SHORT-DURATION ELECTRICAL STORAGE MEANS FOR POWER GENERATION SYSTEM", the entire contents of which are incorporated herein by reference in their entirety.

FIELD OF THE INVENTION

The present invention is directed toward devices and methods of harvesting vehicle energy, and more specifically, toward a weather responsive treadle locking means for power generation system for harvesting vehicle energy.

BACKGROUND OF THE INVENTION

Very few devices that capture energy from passing vehicles have been implemented, despite numerous designs put forth by various parties over the years. Issues of efficiency, reliability, and manufacturability, among others, have limited the practicality of vehicle energy harvesting devices. Added to the challenge is the variability of vehicle sizes, speeds, axle configurations, and lane positions, all of which can greatly influence the operation of a device trying to capture the motion energy of vehicles and convert it into a useful form of energy.

Therefore, a need exists for an energy capture device and method having improved efficiency, reliability, and manufacturability, as well as practicality. A need also exists for an energy capture device and method that takes into account the variability of vehicle sizes, speeds, axle configurations, and lane positions in converting the captured motion energy of vehicles into a useful form of energy.

SUMMARY OF THE INVENTION

These problems and others are addressed by the present invention, which provides a novel vehicle energy harvester that overcomes many of the issues with the conventional devices and is therefore better suited for real-world implementation than the conventional devices.

The exemplary embodiments of the invention make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators.

The disclosed embodiments provide a vehicle energy harvester and power generation system that is simple to install, provides a short payback period, and has a scalable configuration. More particularly, the disclosed embodiments can provide a simple and reliable mechanical configuration that can withstand sever environments. The low cost configuration of the system may provide for faster payback of the expense of the system, and therefore, make the system more practical and desirable for practical applications.

Additionally, the ease with which the system can be installed also may make the system more practical and desirable for practical applications. The disclosed embodiments require little or no excavation and can be installed in a few hours, instead of over several days as with conventional devices.

The disclosed embodiment also can provide a scalable configuration that may be particularly advantageous for use at locations, such as exits ramps, toll plazas, hills, among other locations.

An embodiment also can include monitoring the status or operation of the unit, either periodically or 24 hours per day, seven days per week, using for example, a wireless link or other wired or wireless communication device.

The exemplary embodiments improve the durability of the system under practical use scenarios. The exemplary embodiments of the invention are capable of withstanding the stresses placed upon the system during normal use. The exemplary embodiments of the invention recognize that numerous factors may reduce the durability of the system under normal use including, for example, motor vehicles impacting the treadles at highway/freeway speeds of 60 to 70 miles per hour or more, and ice build-up restricting free movement of the treadle assembly, among other things.

The exemplary embodiments of the invention address and solve these problems and improve the durability of a treadle based energy conversion systems according to the exemplary embodiments of the invention.

In order to reduce the wear and tear on the treadle assembly, exemplary embodiments of the present invention can include a temperature sensor that aids in determining whether icy (freezing) conditions might prevent normal operation of the treadle assembly.

Additionally or alternatively, exemplary embodiments of the present invention can include a precipitation detector that aids in determining whether icy (freezing) conditions might prevent normal operation of the treadle assembly.

Additionally or alternatively, exemplary embodiments of the present invention can include a treadle locking means such that the unit can be locked safely in a flat (level with the road surface) position until more favorable weather conditions are detected.

An exemplary embodiment of the invention is directed to, for example, a vehicle energy harvester comprising a subunit having an upper surface forming a roadway surface, a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and a treadle locking device that selectively locks the vehicle activated treadle in the second position.

Another exemplary embodiment of the invention is directed to, for example, a vehicle energy harvester comprising a plurality of subunits each having an upper surface forming a roadway surface, a vehicle activated treadle on at least one of the plurality of subunits, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and a treadle locking device that selectively locks the vehicle activated treadle in the second position.

Another exemplary embodiment of the invention is directed to, for example, a vehicle energy harvester comprising a subunit having an upper surface forming a roadway surface, a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and treadle locking means for selectively locking the vehicle activated treadle in the second position.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

Figure 1:
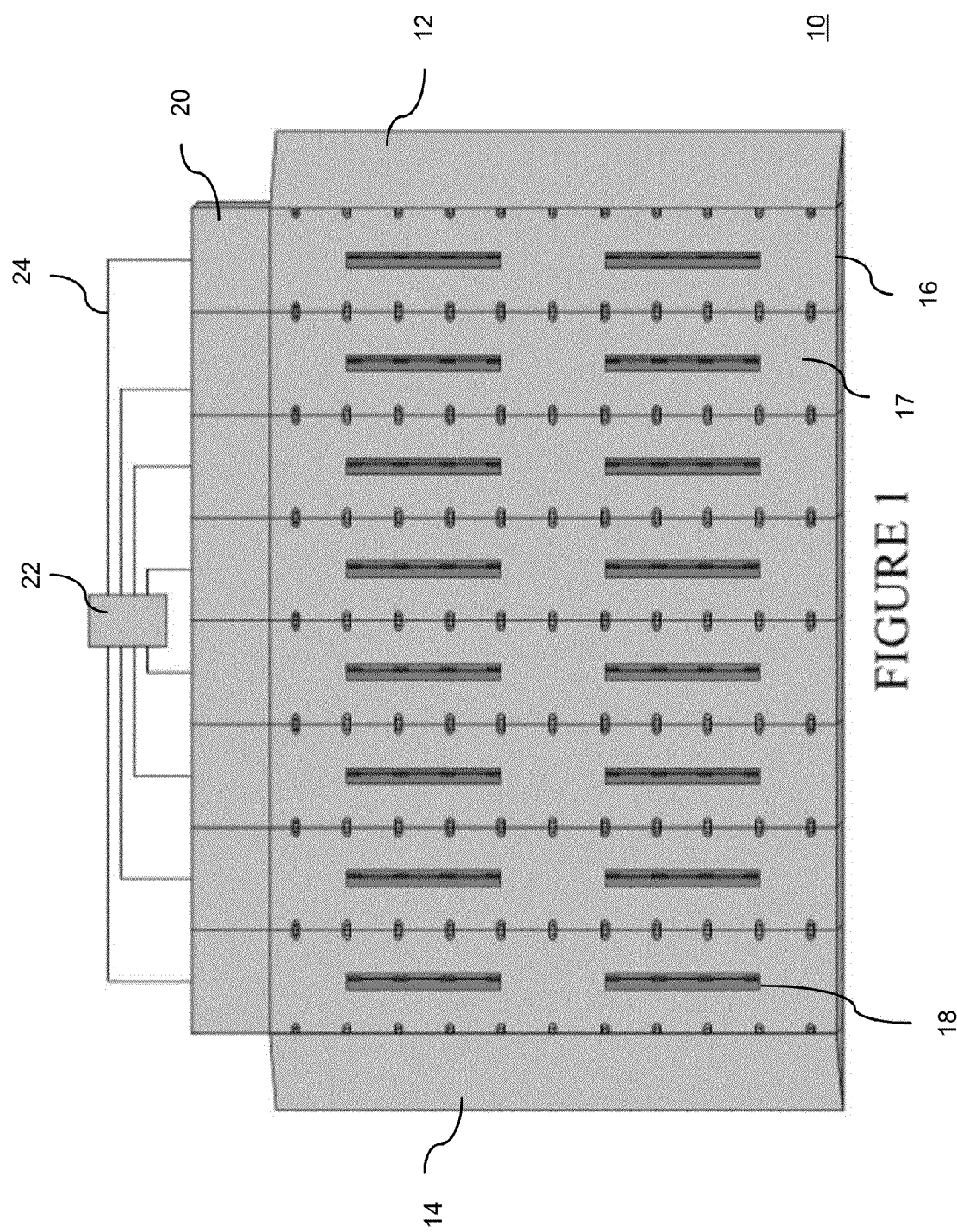
FIG. 1 is a schematic top view of a power absorber unit of a vehicle energy harvester.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1-5 illustrate an exemplary vehicle energy harvester.

The exemplary embodiments can make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators. Other means for converting the mechanical energy to electrical energy also are contemplated. In an exemplary aspect, the electric power from the generators can be converted, metered, and fed into the commercial power grid. In another exemplary aspect, each site can be equipped with wireless communications to monitor the status and/or output of the system.

Power Absorber Configuration

The disclosed embodiments can include individual assemblies with integral generators. Other generator configurations also are possible, such as separate generators.

As shown in FIG. 1, the vehicle energy harvester unit 10 can be a low-profile surface mounted assembly. The vehicle energy harvester unit 10 can include an entry ramp 12 and an exit ramp 14. The vehicle energy harvester unit 10 can include a plurality of subunits 16 having a top surface or driving surface 17. Each subunit can include one or more vehicle activated treadles 18. In an embodiment, each subunit 16 can include a generator unit 20.

In other embodiments, the vehicle energy harvester unit 10 can be set into the road surface. The surface mounted assembly may require minimal installation effort. Additionally, the unit count can be scaled to road/breaking needs. In an embodiment, each generator unit 20 can feed a common power summing/conversion unit 22. A simple cable interconnect 24 can be provided to connect each generator unit 20 to the common power summing/conversion unit 22. A fail safe configuration can protect the system against individual unit failures.

Power Conversion Unit

In a disclosed embodiment, the individual absorber units 16 can be connected via cable assemblies 24. The input power can be summed and applied to a low-loss inverter unit. The power can be converted immediately to a form that is transmittable to the power grid. The output can be metered and applied to the power grid for transmission.

Absorber Unit Operation

Figure 2:
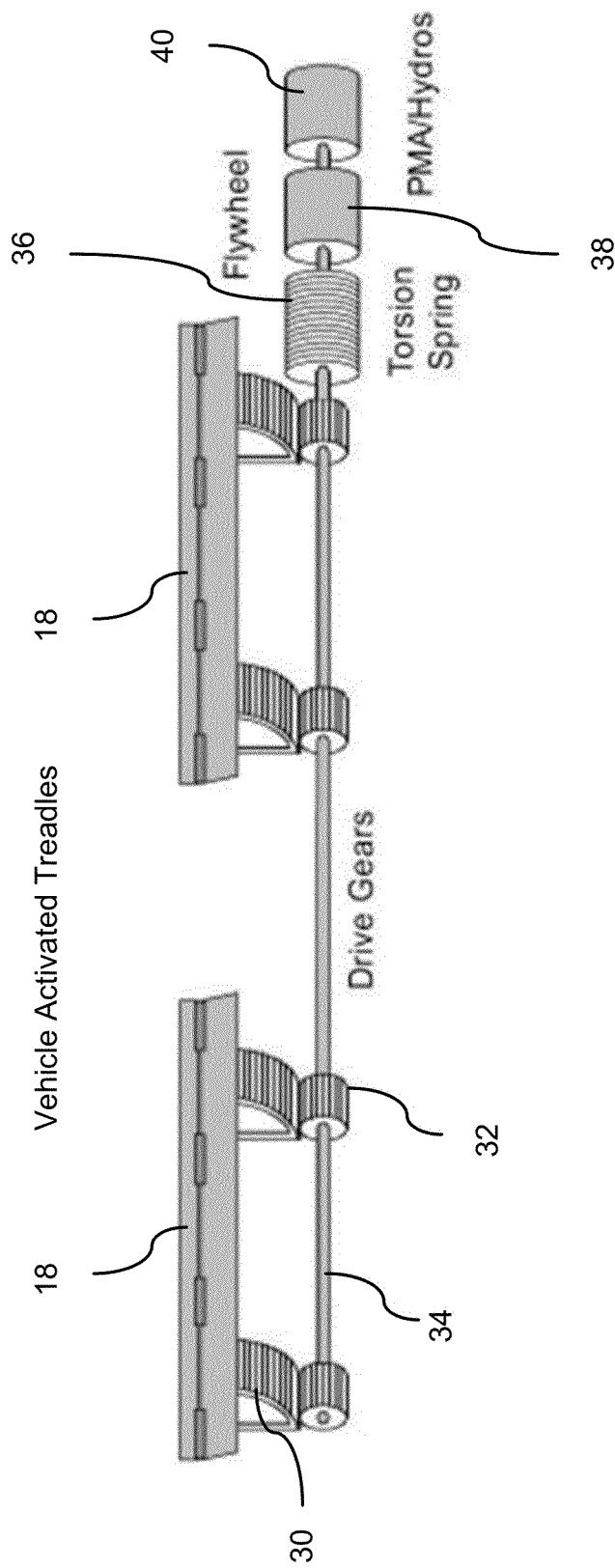
FIG. 2 is a schematic perspective side view illustrating a portion of a vehicle energy harvester.

With reference to FIG. 2, an exemplary embodiment of a subunit 16 of a vehicle energy harvester unit 10 can include spring-loaded treadles 18 having a treadles gear 30 engaging a drive gear 32. The drive gear 32 is coupled to a shaft 34. In operation, one or more vehicle tires force the spring-loaded treadles 18 down as they roll over the treadles 18. The treadle gears 30 drive the plurality of drive gears 32, which rotate the shaft 34. The shaft 34 winds a torsion spring 36, thereby absorbing the treadle drive transient. A pawl can lock the shaft 34 as rotation ends. The torsion spring 36 rotates a flywheel 38, thereby spreading the impulse of the treadle drive over time to extend output to a generator 40. The flywheel 38 can turn a generator 40, such as a hydro pump. The generator 40, in turn, can generate electric power for sale/use/storage.

The exemplary embodiments improve the durability of the system under practical use scenarios. The exemplary embodiments of the invention are capable of withstanding the stresses placed upon the system during normal use, as well as minimizing or preventing interference or damage to the system resulting from other factors. The exemplary embodiments of the invention recognize that factors that may reduce the durability of the system under normal use further include, for example, environmental conditions such as ambient temperature, rain, sleet, snow, or ice, among other things.

The exemplary embodiments of the invention address and solve these problems and improve the durability of a treadle based energy conversion systems according to the exemplary embodiments of the invention.

Temperature Detector

Figure 3:
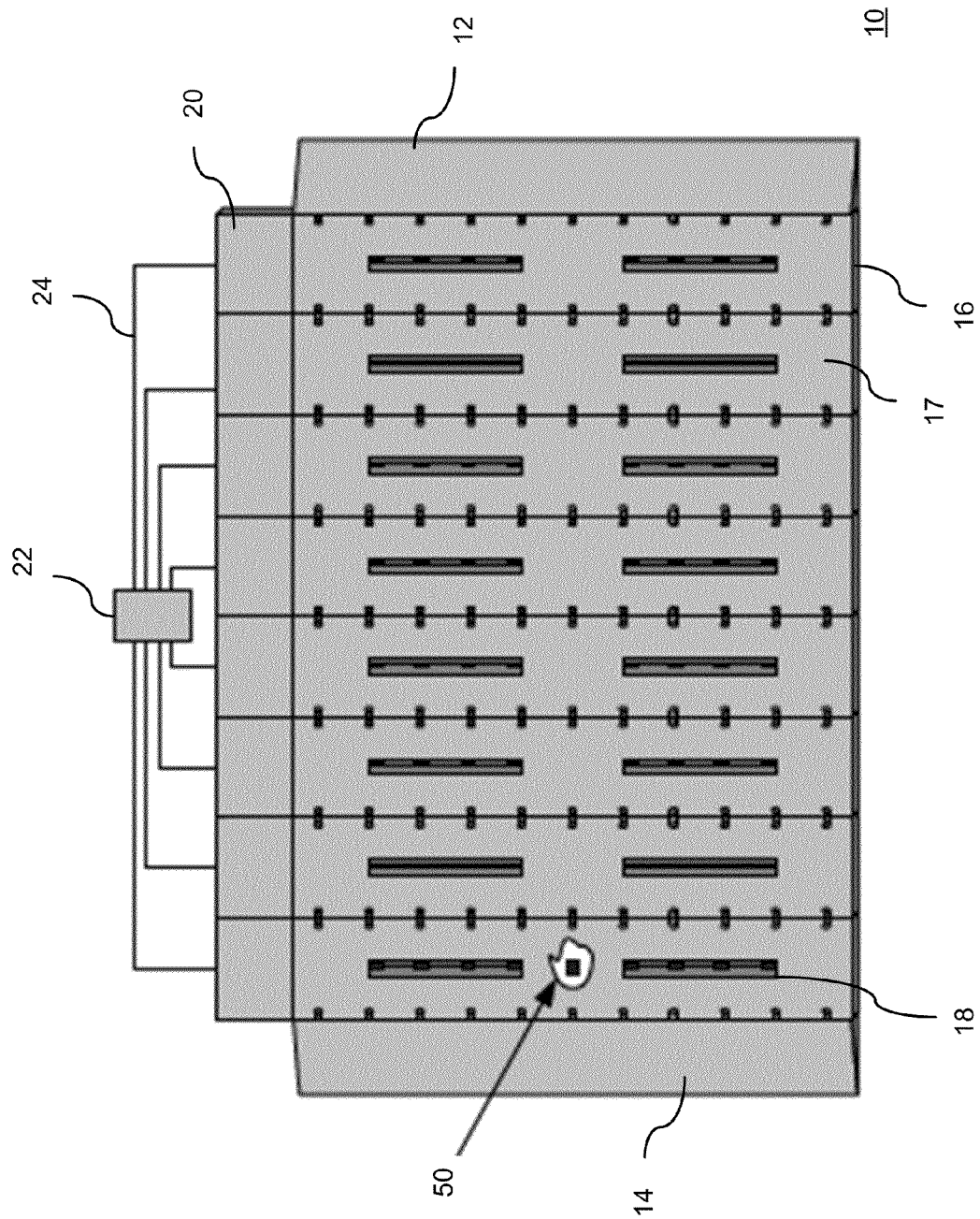
FIG. 3 is a schematic top view of a vehicle energy harvester having a temperature sensor.

With reference to FIG. 3, an exemplary embodiment of a vehicle energy harvester having at least one temperature detector 50 will now be described.

In order to reduce the wear and tear on the treadle assembly (e.g., 18), exemplary embodiments of the present invention can include one or more temperature sensors 50 that aid in determining whether icy (freezing) conditions may prevent normal operation of the treadle assembly. The temperature sensor 50 can be mounted, for example, under a top cover plate or driving surface 17 of one or more subunits 16. In other embodiments, the temperature sensor 50 can be mounted on or in a surface of the top cover plate or driving surface 17 of one or more subunits 16, or on another part of the vehicle energy harvester unit 10. Alternatively, the temperature sensor 50 can be separate from the vehicle energy harvester unit 10 and communicate with the vehicle energy harvester unit 10 via a wired connection or wireless connection. In this manner, the temperature sensor 50 can accurately measure surface temperatures of the vehicle energy harvester unit 10.

A common, commercially available, semiconductor temperature sensor 50, such as the XXX-111 temperature sensor or the like, can be used in conjunction with a low-cost micro-controller unit (MCU) (not shown) to determine if hazardous conditions exist. An embodiment having a low-cost single chip (IC) arrangement can provide a very reliable and durable design. One of ordinary skill in the art will recognize that integrated circuits (ICs) with temperature conversion accuracy of 0.5 degrees are readily available. These circuits can provide a simple serial (digital) output to the micro-controller unit (MCU). The micro-controller unit (MCU) can use the temperature sensor 50 to control overall operation of the vehicle energy harvester unit 10. In other embodiments, the temperature sensor 50 can be used in conjunction with other sensors or detectors, for example, as described in the exemplary embodiments below.

Precipitation Detector

Figure 4:
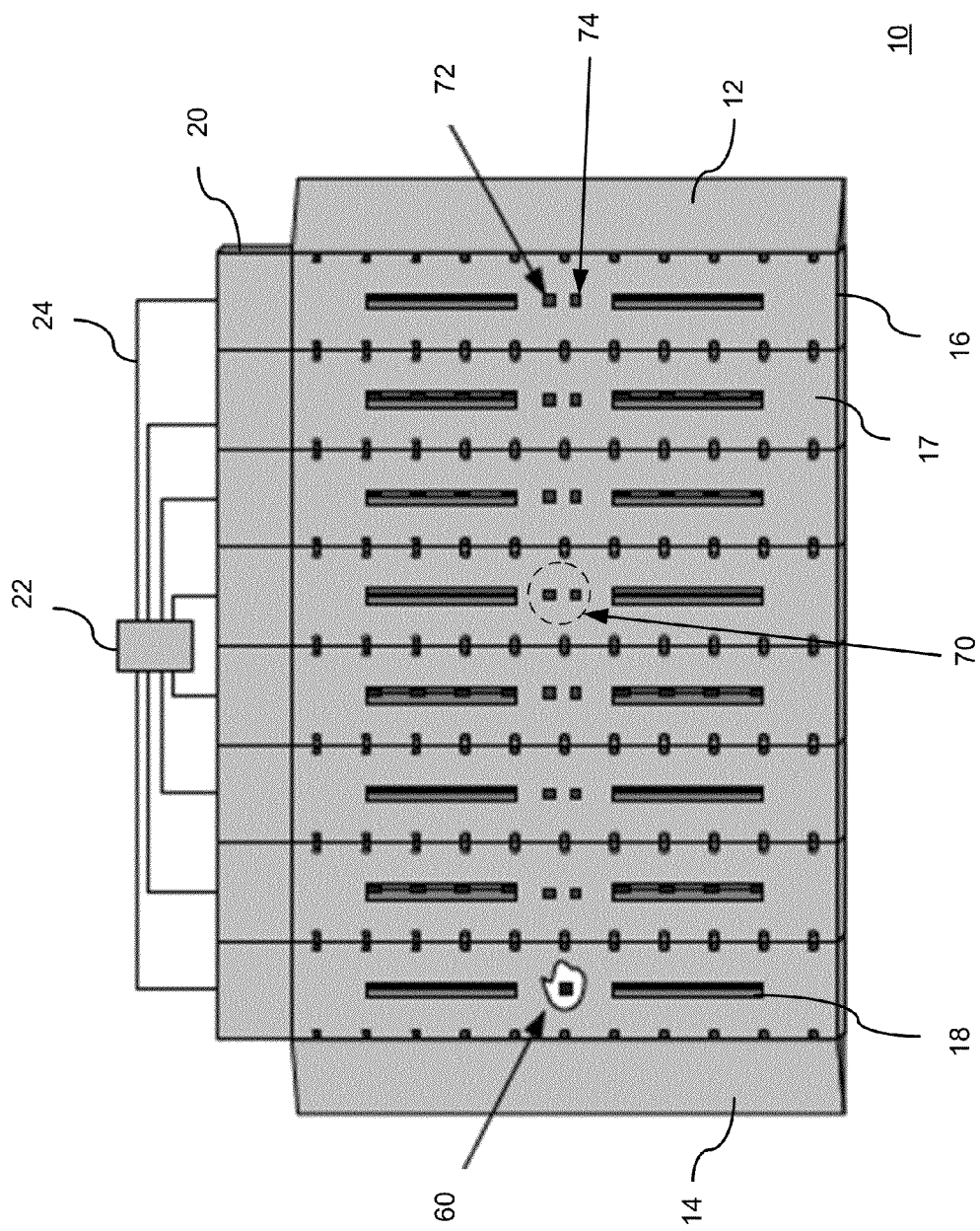
FIG. 4 is a schematic top view of a vehicle energy harvester having a precipitation sensor.

With reference to FIG. 4, an exemplary embodiment of a vehicle energy harvester having at least one precipitation detector 60 and/or a snow/ice sensor 70 will now be described.

An exemplary embodiment of the present invention can include one or more precipitation detectors 60 that aid in determining whether icy (e.g., freezing) conditions may prevent normal operation of the treadle assembly (e.g., 18). One of ordinary skill in the art will recognize that a common operational amplifier can be as a precipitation detector 60 and configured as shown, for example, in FIG. 4 to detect the presence of liquid precipitation (rain). The precipitation detector 60 can be mounted, for example, under a top cover plate or driving surface 17 of one or more subunits 16. In other embodiments, the precipitation detector 60 can be mounted on or in a surface of the top cover plate or driving surface 17 of one or more subunits 16, or on another part of the vehicle energy harvester unit 10. Alternatively, the precipitation detector 60 can be separate from the vehicle energy harvester unit 10 and communicate with the vehicle energy harvester unit 10 via a wired connection or wireless connection. In this manner, the precipitation detector 60 can accurately detect the presence of liquid on or in one or more subunits 16 of the vehicle energy harvester unit 10. In other embodiments, the precipitation detector 60 can include a plurality of contacts that can be used to estimate the amount of rain fall. The precipitation detector 60 can take samples continuously or periodically to conserve power usage.

In addition, one or more snow/ice sensors 70 having, for example, a small, low-cost infrared emitter/detector 72, 74 can be used as illustrated in FIG. 4 to detect the presence of snow and/or ice obscuring a channel between the emitter and detector 72, 74. Other conventional devices for detecting the presence of snow and/or ice can be used.

The snow/ice sensor 70 can be mounted, for example, on or in a surface of the top cover plate or driving surface 17 of one or more subunits 16, or on another part of the vehicle energy harvester unit 10. Alternatively, the snow/ice sensor 70 can be separate from the vehicle energy harvester unit 10 and communicate with the vehicle energy harvester unit 10 via a wired connection or wireless connection. In this manner, the snow/ice sensor 70 can accurately detect the presence of snow or ice on one or more subunits 16 of the vehicle energy harvester unit 10. The snow/ice sensor 70 can take samples continuously or periodically to conserve power usage. One or more snow/ice sensors 70 can be used in conjunction with, for example, the temperature sensor 50 and a low-cost micro-controller unit (MCU), for example, to determine if hazardous conditions exist.

Treadle Locking Means

Figure 5:
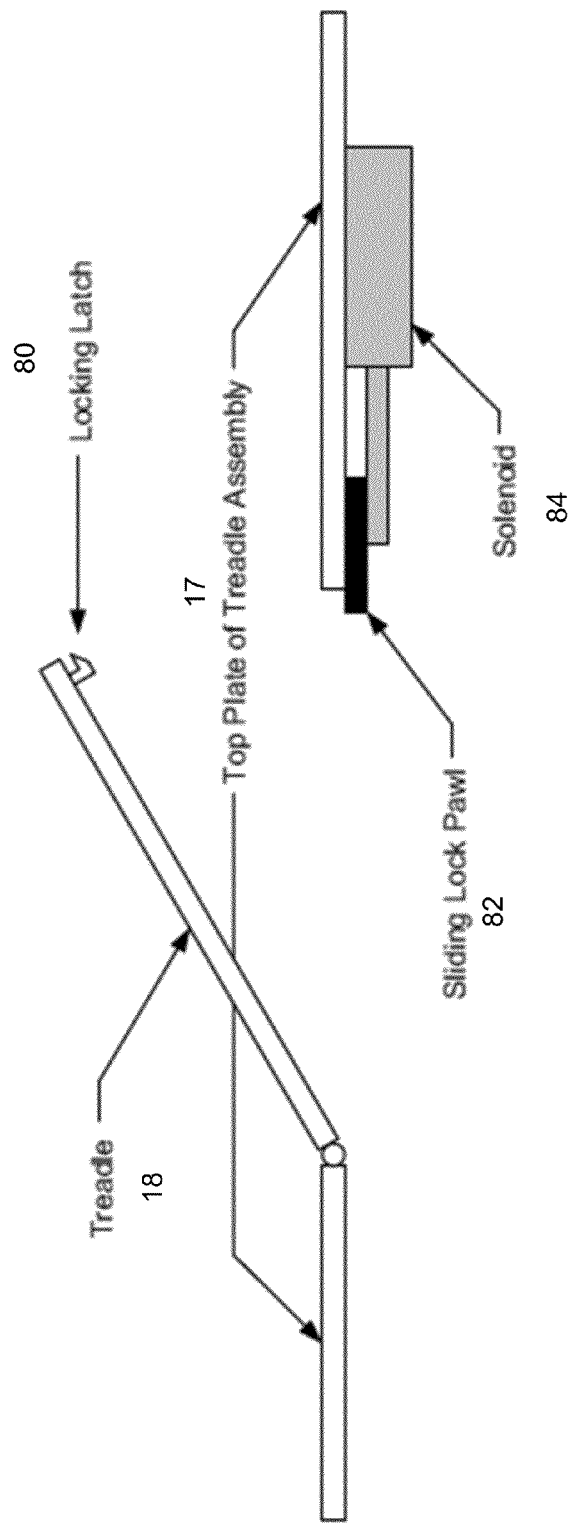
FIG. 5 is a schematic side view of a vehicle energy harvester having a treadle locking means.

With reference to FIG. 5, an exemplary embodiment of a vehicle energy harvester having at least one treadle locking means will now be described.

In an exemplary aspect, during normal operation, the treadle 18 is in the active (elevated) position and pushed downward upon impact with a tire of an oncoming motor vehicle. If ice is formed inside the vehicle energy harvester unit 10, the treadle assembly may no longer be free to move when struck by the tire of the vehicle. Instead, the momentum of the vehicle may be applied directly and entirely to the mechanical components connected to the treadle 18. This type of collision may result (or will almost certainly result) in physical damage to the vehicle energy harvester unit 10 (e.g., bending or breaking of mechanical members, stripping gearbox assemblies, etc.). To minimize or prevent such damage in freezing weather, the exemplary embodiments of a vehicle energy harvester unit 10 can be equipped with a solenoid operated locking pawl such that the unit can be locked safely in a flat (i.e., level with the driving surface 17) position until more favorable weather conditions are detected. This locking means also can minimize or prevent damage to the vehicle energy harvester unit 10 that may be caused by snow removal equipment operating on the road surface or driving surface 17.

As illustrated in FIG. 5, the spring-loaded treadles 18 can be configured to pivot about one end. In operation, one or more vehicle tires force the spring-loaded treadles 18 down into a flush position with the driving surface 17 as they roll over the treadles 18. An exemplary embodiment of treadle locking means for a vehicle energy harvester unit 10 can include a locking latch 80 coupled to a portion of the treadle 18, for example, a free or open end of the treadle 18 as shown in FIG. 5. A portion of the subunit 16 that is opposite to the hinged side of the treadle 18 can include a sliding lock pawl 82 configured to selectively engage the locking latch 80 to secure the treadle 18 in a closed or flush position with the driving surface 17 of the subunit 16. The sliding lock pawl 82 can be moved into a locked or unlocked position by a solenoid 84 or the like. The solenoid 84 can move the locking pawl 82 in or out (e.g., right or left as shown in FIG. 5) under control of the micro-controller unit (MCU). For example, the application of voltage to the solenoid 84 can push the pawl to the left to lock the treadle down.

In operation, the impact of the tire of a vehicle travelling on the driving surface 17 can force the treadle 18 downward into a flush position with the driving surface 17 and cause the locking latch 80 to engage with the sliding lock pawl 82. The power to the solenoid 84 can be removed to conserve power after the treadle 18 is locked. By reversing the voltage to the solenoid 84, the solenoid 84 momentarily will move the sliding lock pawl 82 to the right and release the locking latch 80 of the treadle 18 such that the treadle 18 can return to an elevated or open position (e.g., active position).

Other locking means are possible for securing and locking the treadle 18 in a flush position with the driving surface 17. The locking means can be using in conjunction with a micro-controller unit (MCU) and one or more of the temperature sensor 50, precipitation sensor 60, and snow/ice sensor 70. In this manner, the micro-controller unit (MCU) can apply or remove voltage from the solenoid 84 to lock or unlock the treadle 18 based on signals or input received from one or more of the temperature sensor 50, precipitation sensor 60, and snow/ice sensor 70, thereby locking or securing the treadle 18 in a flush position with the driving surface 17 when conditions exist that may affect the operation of the vehicle energy harvester unit 10. Accordingly, the exemplary embodiments can improve the durability of the system under practical use scenarios. The exemplary embodiments of the invention are capable of withstanding the stresses placed upon the system during normal use, as well as minimizing or preventing interference or damage to the system resulting from other factors, for example, including environmental conditions such as ambient temperature, rain, sleet, snow, or ice, among other things.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

What is claimed is:

1. A vehicle energy harvester comprising:
    a subunit having an upper surface forming a roadway surface;
    a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface;
    a treadle gear coupled to the vehicle activated treadle;
    a rotatable shaft below the roadway surface;
    a drive gear mounted on the rotatable shaft, the drive gear being driven by the treadle gear during movement of the vehicle activated treadle;
    a flywheel;
    a torsion spring coupled between the rotatable shaft and the flywheel;
    a generator that generates power in response to movement of the flywheel; and
    a treadle locking device configured to selectively lock the vehicle activated treadle in the second position in response to a signal received from a sensor.

2. The vehicle energy harvester of claim 1, wherein the treadle locking device includes:
    a locking latch on the vehicle activated treadle; and
    a locking pawl on the subunit that selectively engages the locking latch to lock the vehicle activated treadle in the second position.

3. The vehicle energy harvester of claim 2, wherein the treadle locking device includes:
    a solenoid that selectively engages the locking pawl with the locking latch.

4. The vehicle energy harvester of claim 2, wherein the vehicle activated treadle includes a spring that biases the vehicle activated treadle toward the first position.

5. The vehicle energy harvester of claim 2, wherein a first end of the vehicle activated treadle is pivotably coupled to the subunit,
    wherein the locking latch is mounted on an underside of the vehicle activated treadle at a second end of the vehicle activated treadle that is opposite to the first end of the vehicle activated treadle, and
    wherein the locking pawl is coupled to the subunit below the upper surface of the roadway surface and adjacent to the second end of the treadle locking device when the treadle locking device is in the second position.

6. The vehicle energy harvester of claim 1, wherein the treadle locking device is concealed below the upper surface of the roadway surface when the treadle locking device is locked in the second position.

7. The vehicle energy harvester of claim 1,
wherein the sensor is a temperature sensor one of on, in, and under the upper surface of the roadway surface,
wherein the treadle locking device selectively locks the vehicle activated treadle in the second position in response to a signal from the temperature sensor.

8. The vehicle energy harvester of claim 1,
wherein the sensor is a temperature sensor in one of wired and wireless communication with the treadle locking device, wherein the treadle locking device selectively locks the vehicle activated treadle in the second position in response to a signal from the temperature sensor.

9. The vehicle energy harvester of claim 1,
wherein the sensor is a snow and ice sensor one of on and in the upper surface of the roadway surface, wherein the treadle locking device selectively locks the vehicle activated treadle in the second position in response to a signal from the snow and ice sensor.

10. The vehicle energy harvester of claim 9, wherein the snow and ice sensor includes an infrared emitter and an infrared detector.

11. The vehicle energy harvester of claim 1,
wherein the sensor is a snow and ice sensor in one of wired and wireless communication with the treadle locking device, wherein the treadle locking device selectively locks the vehicle activated treadle in the second position in response to a signal from the snow and ice sensor.

12. The vehicle energy harvester of claim 11, wherein the snow and ice sensor includes an infrared emitter and an infrared detector.

13. A vehicle energy harvester comprising:
a plurality of subunits each having an upper surface forming a roadway surface;
a vehicle activated treadle on at least one of the plurality of subunits, the vehicle activated treadle moveable between a first position in which an upper surface of the treadle is at an angle with respect to the upper surface of the roadway surface and a second position in which the upper surface of the treadle is flush with the upper surface of the roadway surface;
a treadle gear coupled to the vehicle activated treadle;
a rotatable shaft below the roadway surface;
a drive gear mounted on the rotatable shaft, the drive gear being driven by the treadle gear during movement of the vehicle activated treadle;
a flywheel;
a torsion spring coupled between the rotatable shaft and the flywheel;
a generator that generates power in response to movement of the flywheel; and
a treadle locking device that selectively locks the vehicle activated treadle in the second position in response to a signal received from a sensor.

14. The vehicle energy harvester of claim 13, wherein the treadle locking device includes:
a locking latch on the vehicle activated treadle; and
a locking pawl on the subunit that selectively engages the locking latch to lock the vehicle activated treadle in the second position.

15. The vehicle energy harvester of claim 14, wherein the vehicle activated treadle includes a spring that biases the vehicle activated treadle toward the first position.

16. The vehicle energy harvester of claim 14, wherein a first end of the vehicle activated treadle is pivotably coupled to the subunit,
wherein the locking latch is mounted on an underside of the vehicle activated treadle at a second end of the vehicle activated treadle that is opposite to the first end of the vehicle activated treadle, and
wherein the locking pawl is coupled to the subunit below the upper surface of the roadway surface and adjacent to the second end of the treadle locking device when the treadle locking device is in the second position.

17. The vehicle energy harvester of claim 13, wherein the treadle locking device is concealed below the upper surface of the roadway surface when the treadle locking device is locked in the second position.

18. The vehicle energy harvester of claim 13, wherein the sensor is a temperature sensor,
wherein the treadle locking device selectively locks the vehicle activated treadle in the second position in response to a signal from the temperature sensor.

19. The vehicle energy harvester of claim 13, wherein the sensor is a snow and ice sensor, and
wherein the treadle locking device selectively locks the vehicle activated treadle in the second position in response to a signal from the snow and ice sensor.

20. A vehicle energy harvester comprising:
a subunit having an upper surface forming a roadway surface;
a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface;
a treadle gear coupled to the vehicle activated treadle;
a rotatable shaft below the roadway surface;
a drive gear mounted on the rotatable shaft, the drive gear being driven by the treadle gear during movement of the vehicle activated treadle;
a flywheel;
a torsion spring coupled between the rotatable shaft and the flywheel;
a generator that generates power in response to movement of the flywheel; and
treadle locking means for selectively locking the vehicle activated treadle in the second position in response to a signal received from a sensor.

* * * * *